United States Patent
Sewell

(10) Patent No.: US 11,229,985 B2
(45) Date of Patent: *Jan. 25, 2022

(54) CHAIN RECONDITIONING DEVICES AND METHODS

(71) Applicant: DFA DAIRY BRANDS IP, LLC, Dallas, TX (US)

(72) Inventor: Larry Sewell, Moreno Valley, CA (US)

(73) Assignee: DFA Dairy Brands IP, LLC, Dallas, TX (US)

(*) Notice: Subject to any disclaimer, the term of this patent is extended or adjusted under 35 U.S.C. 154(b) by 351 days.

This patent is subject to a terminal disclaimer.

(21) Appl. No.: 16/391,008

(22) Filed: Apr. 22, 2019

(65) Prior Publication Data

US 2019/0283203 A1    Sep. 19, 2019

Related U.S. Application Data

(63) Continuation of application No. 15/724,987, filed on Oct. 4, 2017, now Pat. No. 10,265,827, which is a
(Continued)

(51) Int. Cl.
*B24B 23/08* (2006.01)
*B65G 45/00* (2006.01)

(52) U.S. Cl.
CPC .............. *B24B 23/08* (2013.01); *B65G 45/00* (2013.01)

(58) Field of Classification Search
CPC .......... B65G 45/00; B65G 45/16; B24B 23/08
See application file for complete search history.

(56) References Cited

U.S. PATENT DOCUMENTS 628,087 A * 7/1899 Gibford ................. B27B 17/08
                                                         474/92
648,866 A * 5/1900 Gibford ................. B65G 45/16
                                                         474/92
(Continued)

FOREIGN PATENT DOCUMENTS

EP       1240886 A1     9/2002
EP       1395508 A2     3/2004
(Continued)

OTHER PUBLICATIONS

"Increasing the life of conveyor chain," FB Conveyor Chain, available at http://www.conveyorchain.co.uk/conveyor-chain/increasing-the-life-of-conv- eyor-chain, 1 page, available prior to the filing date of the present application.
(Continued)

*Primary Examiner* — Mark A Deuble
(74) *Attorney, Agent, or Firm* — Faegre Drinker Biddle & Reath LLP

(57) ABSTRACT

A device is adapted to be coupled to a conveyor system and recondition at least one chain of the conveyor system. The device includes a base and at least one attachment element coupled to the base. The attachment element is adapted to detachably couple the device to the conveyor system. At least one reconditioning element is coupled to the base, and the reconditioning element is adapted to engage and recondition the chain as the chain moves relative to the reconditioning element. At least one biasing element is coupled to the reconditioning element, and the biasing element urges the reconditioning element away from the base and into engagement with the chain.

11 Claims, 6 Drawing Sheets

Related U.S. Application Data continuation of application No. 14/981,037, filed on Dec. 28, 2015, now Pat. No. 9,808,904.

(56) References Cited

U.S. PATENT DOCUMENTS

| | | | |
|---|---|---|---|
| 678,109 | A | 7/1901 | Lindsey |
| 1,614,786 | A | 1/1927 | Furbush |
| 3,701,223 | A | 10/1972 | Cole et al. |
| 4,373,009 | A | 2/1983 | Alastair |
| 4,416,367 | A | 11/1983 | Easton et al. |
| 4,458,809 | A | 7/1984 | White et al. |
| 4,588,073 | A | 5/1986 | Abell |
| D326,919 | S | 6/1992 | Geitner et al. |
| D334,064 | S | 3/1993 | Fitzpatrick |
| 5,403,349 | A | 4/1995 | Roehrig |
| 5,649,616 | A | 7/1997 | Stecklow |
| 5,653,731 | A | 8/1997 | Roehrig |
| 5,657,853 | A * | 8/1997 | Pennino ............... B65G 39/073 15/256.52 |
| 6,601,692 | B2 | 8/2003 | Schaefer et al. |
| 6,804,856 | B2 | 10/2004 | Udall |
| 6,964,331 | B1 | 11/2005 | Kerr |
| 6,971,503 | B2 | 12/2005 | Thompson |
| D559,391 | S | 1/2008 | Kliegman et al. |
| 7,757,839 | B2 | 7/2010 | Boudreau |
| 8,066,739 | B2 | 11/2011 | Jackson |
| 8,240,460 | B1 | 8/2012 | Bleau et al. |
| 8,348,046 | B1 | 1/2013 | Baumgardner et al. |
| 8,573,385 | B2 | 11/2013 | Yun |
| 9,102,476 | B2 | 8/2015 | Musick et al. |
| 9,808,904 | B2 | 11/2017 | Sewell |
| 10,265,827 | B2 * | 4/2019 | Sewell ............... B24B 23/08 |
| 2009/0173599 | A1 * | 7/2009 | Khanania ............... B65G 45/12 198/617 |
| 2010/0116621 | A1 * | 5/2010 | DeVries ............... B65G 45/16 198/499 |
| 2014/0262688 | A1 * | 9/2014 | Brunone ............... B65G 45/12 198/499 |
| 2015/0360880 | A1 * | 12/2015 | Krosschell ............ B65G 45/16 198/499 |
| 2017/0182627 | A1 | 6/2017 | Sewell |
| 2018/0029188 | A1 | 2/2018 | Sewell |

FOREIGN PATENT DOCUMENTS

| | | |
|---|---|---|
| EP | 1872766 A2 | 1/2008 |
| WO | 02/96782 A2 | 12/2002 |

OTHER PUBLICATIONS

"Reducing Wear on Conveyor Chain Can Save Time and Money," Richards-Wilcox Conveyor Systems, available at http://www.rwconveyor.com, 2 pages, available prior to the filing date of the present application.

Zielbauer, Paul "Timely Maintenance Extends Conveyor System Life, Assembly," Mar. 29, 2010, available at http://www.assemblymag.com/articles/87819-timely-maintenance-extends.sub.- -conveyor.sub.--system-life, 4 pages.

* cited by examiner

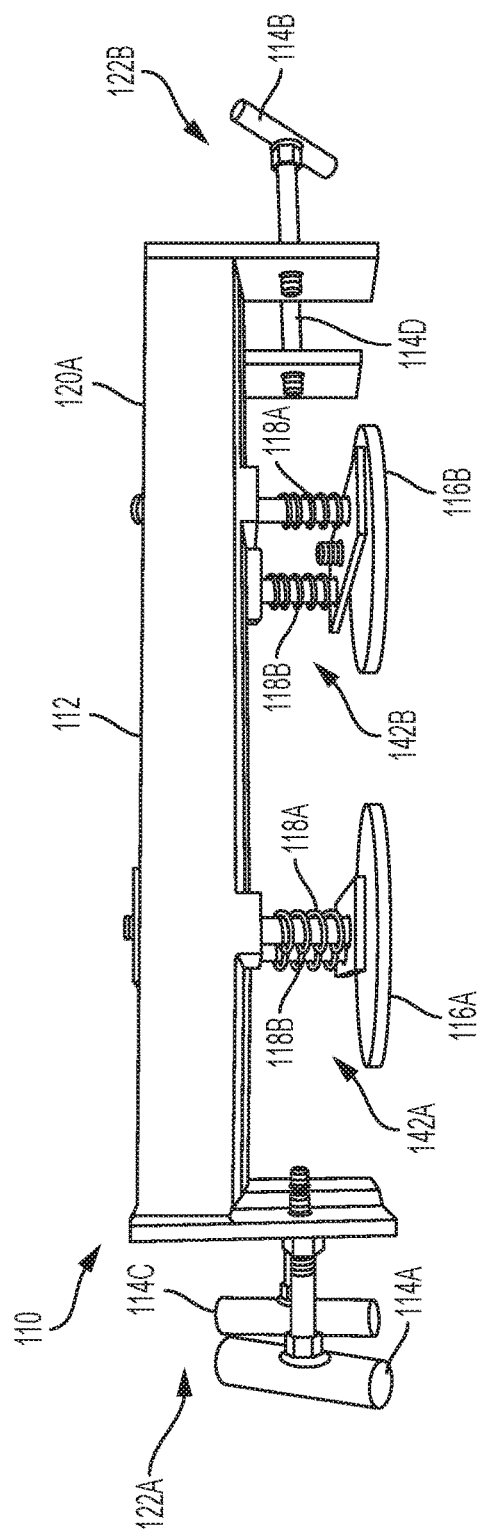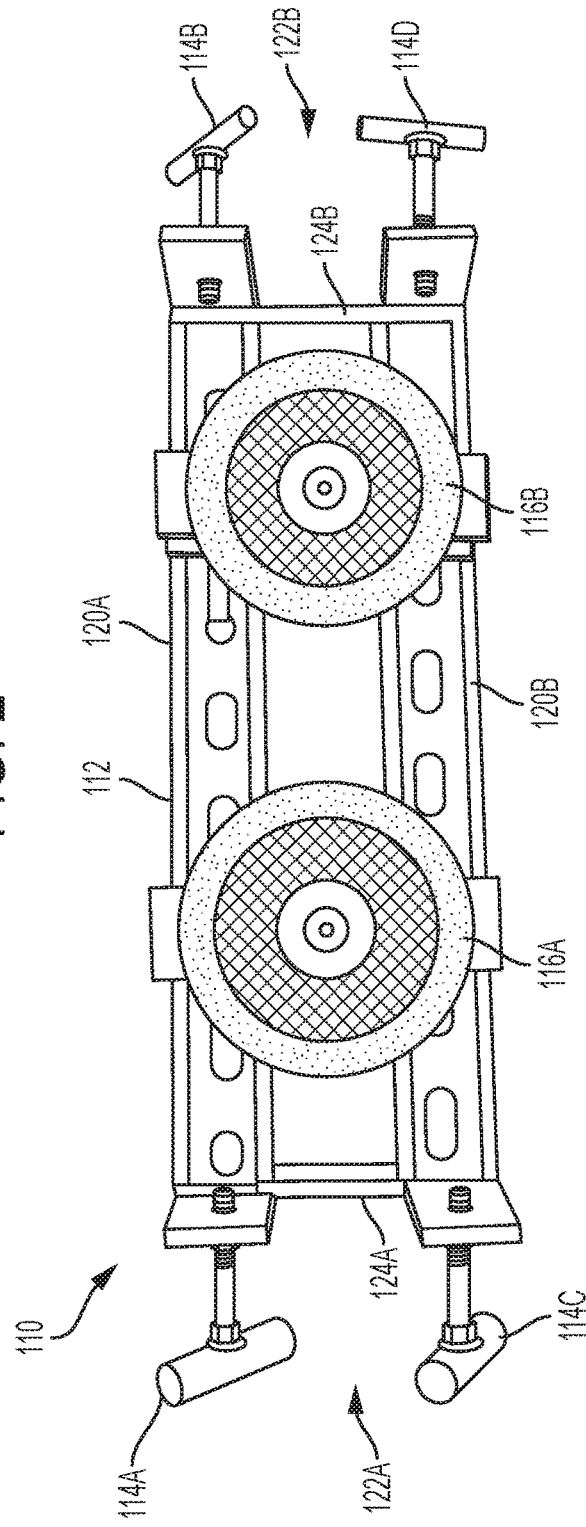

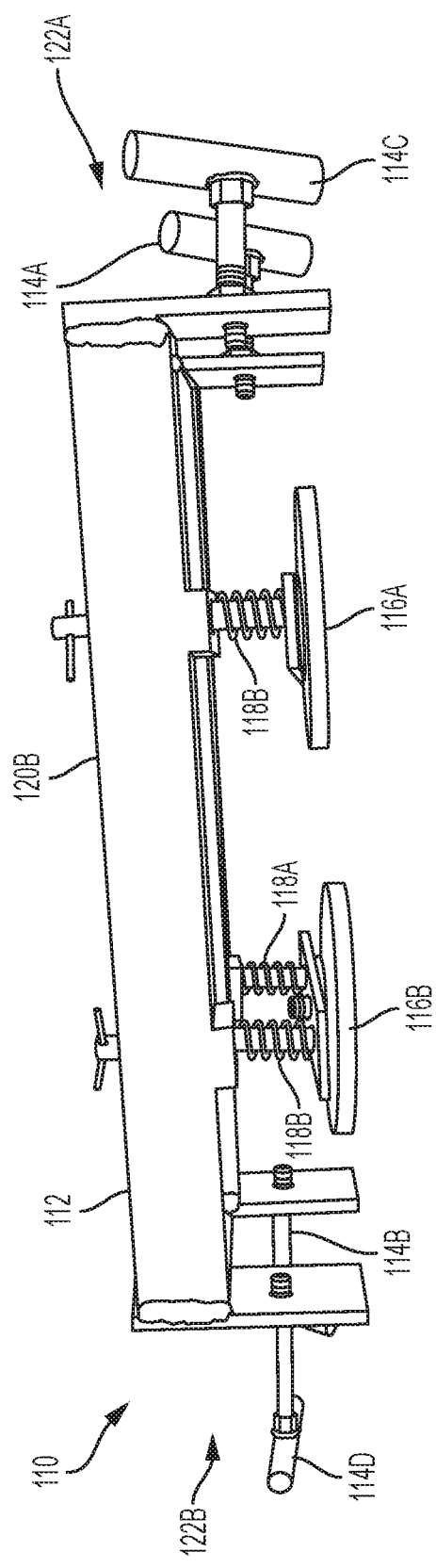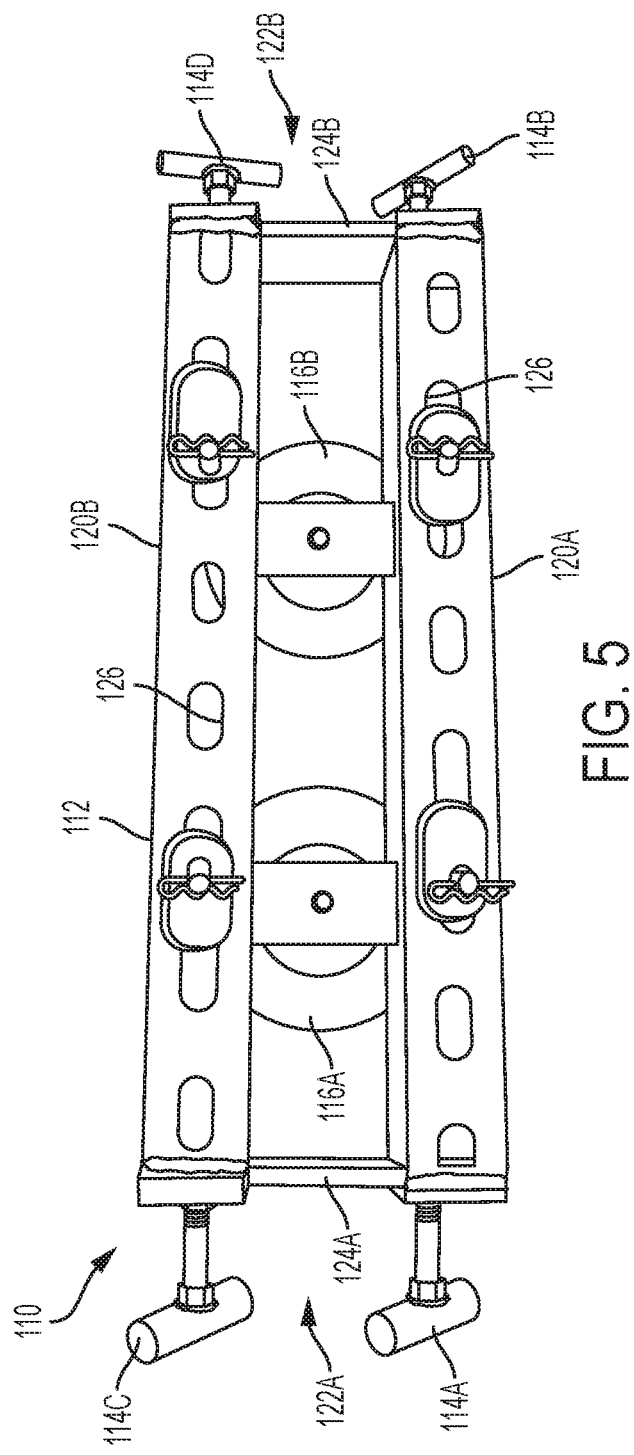

CHAIN RECONDITIONING DEVICES AND METHODS

CROSS-REFERENCE TO RELATED APPLICATIONS

This application is a continuation of U.S. application Ser. No. 15/724,987, filed Oct. 4, 2017, now U.S. Patent No., and titled "CHAIN RECONDITIONING DEVICES AND METHODS," which is a continuation of U.S. application Ser. No. 14/981,037, filed Dec. 28, 2015, now U.S. Pat. No. 9,808,904, and titled "CHAIN RECONDITIONING DEVICES AND METHODS," the entire contents of which are incorporated herein by reference for all purposes.

FIELD

Embodiments of the present disclosure generally relate to devices and methods for reconditioning conveyor chains. In certain embodiments, the present disclosure specifically relates to selectively attachable devices for reconditioning conveyor chains.

BACKGROUND

Manufacturing of various types of consumer products, including dairy products, typically includes using one or more conveyor systems to facilitate transporting products within a manufacturing facility. Such conveyor systems often include a frame that carries one or more drivable chains, which in turn carry and thereby transport containers carrying the consumer products. When such chains carry these containers, the chains may develop defects (for example, sharp edges and/or protrusions) over time. The defects can damage the containers carried thereon. Typically, the defects are removed from chains by temporarily discontinuing use of the conveyor system, removing the chains from the frame, and/or reconditioning the chains. However, such a process is not desirable because it is time-consuming and results in system downtime.

SUMMARY

In some embodiments, the present disclosure addresses the above problems by attaching a chain reconditioning device to a conveyor system at the end of a production shift. The chain reconditioning device includes one or more reconditioning elements (for example, two abrasive pads) that engage and abrade one or more chains (for example, two chains) as the chains relative to the frame, thereby removing defects from the chains. The reconditioning elements are biased toward the chains (for example, via one or more springs) to facilitate movement of the reconditioning elements and applying appropriate forces against the chains.

In some embodiments, the present disclosure provides a device adapted to be coupled to a conveyor system and recondition at least one chain of the conveyor system, the device comprising: a base; at least one attachment element coupled to the base, the attachment element being adapted to detachably couple the device to the conveyor system; at least one reconditioning element coupled to the base, the reconditioning element being adapted to engage and recondition the chain as the chain moves relative to the reconditioning element; and at least one biasing element coupled to the reconditioning element, the biasing element urging the reconditioning element away from the base and into engagement with the chain.

The device of the previous paragraph, wherein the attachment element comprises a screw, the screw being rotatable relative to the base to cause translation of the screw relative to the base to detachably couple the device to the conveyor system.

The device of any of the previous paragraphs, wherein the attachment element is a first attachment element, the first attachment element is disposed on a first side of the base, and further comprising a second attachment element coupled to the base on a second side of the base opposite the first side, the second attachment element being adapted to detachably couple the device to the conveyor system.

The device of any of the previous paragraphs, wherein the reconditioning element comprises an abrasive pad.

The device of any of the previous paragraphs, wherein the biasing element urges the reconditioning element linearly away from the base and into engagement with the chain.

The device of any of the previous paragraphs, wherein the biasing element comprises a compression spring, the compression spring being compressed between the base and the reconditioning element to urge the reconditioning element linearly away from the base and into engagement with the chain.

The device of any of the previous paragraphs, further comprising a shaft carrying the compression spring and coupled to the reconditioning element, the shaft being translatably coupled to the base to facilitate linear translation of the reconditioning element relative to the base.

The device of any of the previous paragraphs, further comprising a support coupled to the shaft opposite the base, the reconditioning element being detachably coupled to the support.

The device of any of the previous paragraphs, wherein the compression spring is a first compression spring, the shaft is a first shaft, and further comprising: a second compression spring, the second compression spring being compressed between the base and the reconditioning element to urge the reconditioning element linearly away from the base and into engagement with the chain; and a second shaft carrying the second compression spring and coupled to the support, the second shaft being translatably coupled to the base to facilitate linear translation of the reconditioning element relative to the base.

The device of any of the previous paragraphs, wherein the abrasive pad comprises a coarseness of 24 grit.

The device of any of the previous paragraphs, wherein the spring comprises a spring constant of 20 lbs. per inch.

The device of any of the previous paragraphs, wherein the spring applies a 40 lb. force to the abrasive pad.

In some embodiments, the present disclosure provides a device adapted to be coupled to a conveyor system and recondition at least one chain of the conveyor system, the device comprising: a base; at least one reconditioning element coupled to the base, the reconditioning element being adapted to engage and recondition the chain as the chain moves relative to the reconditioning element; and at least one biasing element coupled to the reconditioning element, the biasing element urging the reconditioning element linearly away from the base and into engagement with the chain.

The device of the previous paragraph, wherein the reconditioning element comprises an abrasive pad.

The device of any of the previous paragraphs, wherein the biasing element comprises a compression spring, the compression spring being compressed between the base and the reconditioning element to urge the reconditioning element linearly away from the base and into engagement with the chain.

The device of any of the previous paragraphs, further comprising a shaft carrying the compression spring and coupled to the reconditioning element, the shaft being translatably coupled to the base to facilitate linear translation of the reconditioning element relative to the base.

The device of any of the previous paragraphs, further comprising a support coupled to the shaft opposite the base, the reconditioning element being detachably coupled to the support.

The device of any of the previous paragraphs, wherein the compression spring is a first compression spring, the shaft is a first shaft, and further comprising: a second compression spring, the second compression spring being compressed between the base and the reconditioning element to urge the reconditioning element linearly away from the base and into engagement with the chain; and a second shaft carrying the second compression spring and coupled to the support, the second shaft being translatably coupled to the base to facilitate linear translation of the reconditioning element relative to the base.

In some embodiments, the present disclosure provides a method for reconditioning at least one chain of a conveyor system, the method comprising: providing a device comprising: a base; at least one reconditioning element coupled to the base; at least one biasing element coupled to the reconditioning element; coupling the device to the conveyor system; engaging the reconditioning element with the chain; and moving the chain relative to the reconditioning element, wherein the biasing element urges the reconditioning element linearly away from the base to maintain engagement of the reconditioning element with the chain and the reconditioning element reconditions the chain.

The method of the previous paragraph, further comprising decoupling the device from the conveyor system.

The method of any of the previous paragraphs, wherein the device further comprises at least one attachment element, and coupling the device to the conveyor system includes engaging the attachment element with the conveyor system.

The method of any of the previous paragraphs, wherein the attachment element comprises a screw, and engaging the attachment element with the conveyor system includes rotating the screw relative to the base to cause translation of the screw relative to the base.

The method of any of the previous paragraphs, wherein the attachment element is a first attachment element disposed on a first side of the base, further comprising a second attachment element coupled to the base on a second side of the base opposite the first side, and wherein coupling the device to the conveyor system includes engaging the second attachment element with the conveyor system.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 2 is a front view of the chain reconditioning device of FIG. 1.

FIG. 3 is a bottom view of the chain reconditioning device of FIG. 1.

FIG. 4 is a rear view of the chain reconditioning device of FIG. 1.

FIG. 5 is a top view of the chain reconditioning device of FIG. 1.

It should be understood that the drawings are intended facilitate understanding of exemplary embodiments of the present invention are not necessarily to scale.

DETAILED DESCRIPTION

Figure 1:
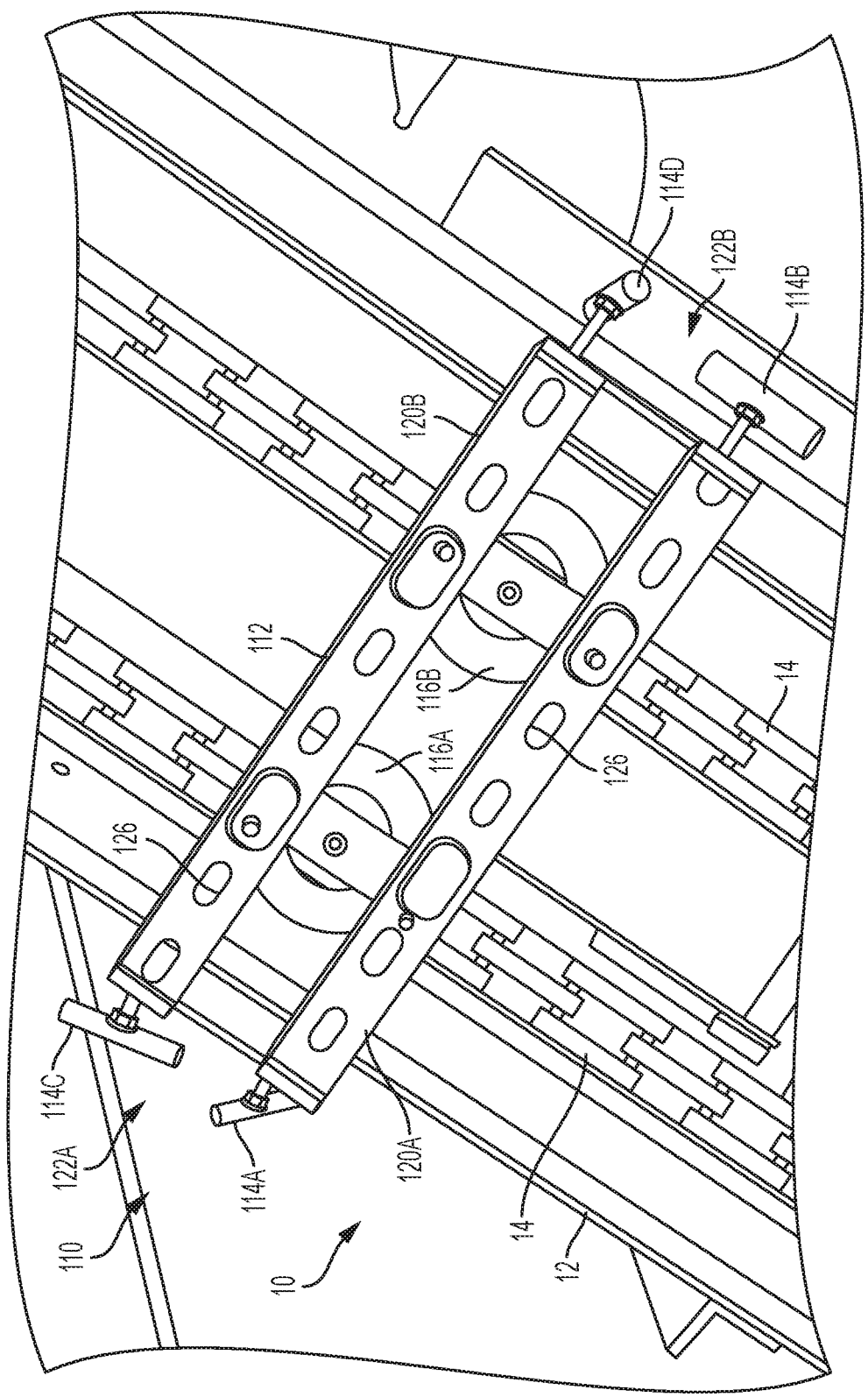
FIG. 1 is a perspective view of a chain reconditioning device according to an embodiment of the present disclosure coupled to a conveyor system.

FIG. 1 illustrates a conveyor system 10 including a frame 12 that movably carries one or more drivable chains 14. The chains 14 carry and thereby transport containers carrying consumer products when driven relative to the frame 12. FIGS. 1 and 2 illustrate an exemplary embodiment of a chain reconditioning device 110 that is selectively and/or removably attachable to the conveyor system 10. The chain reconditioning device 110 may be coupled to the conveyor system 10 to remove defects from the chains 14, for example, at the end of a production shift.

Referring now to FIGS. 2-5, the chain reconditioning device 110 generally includes a base 112 and one or more attachment elements 114A, 114B, 114C, 114D that are coupled to the base 112. The attachment elements 114A, 114B, 114C, 114D detachably couple the chain reconditioning device 110 to the frame 12 of the conveyor system 10. The chain reconditioning device 110 also includes one or more reconditioning elements 116A, 116B that are coupled to the base 112. The reconditioning elements 116A, 116B each engage and recondition one of the chains 14 as the chains 14 move relative to the reconditioning elements 116A, 116B. The chain reconditioning device 110 further includes one or more biasing elements 118A, 118B coupled to the reconditioning elements 116A, 116B. The biasing elements 118A, 118B urge the reconditioning elements 116A, 116B away from the base 112 and into engagement with the chains 14. These aspects and further details of the chain reconditioning device 110 are described in further detail below.

Still referring to FIGS. 2-5, the base 112 includes a first elongated element 120A and a second elongated element 120B that extend from a first side 122A of the base 112 to a second side 122B of the base 112. In some embodiments, the first elongated element 120A and the second elongated element 120B may extend substantially parallel to each other (that is, parallel within 10 degrees). The first elongated element 120A and the second elongated element 120B are coupled to each other via a first bracket 124A and a second bracket 124B (see FIG. 3) disposed at the first side 122A and the second side 122B of the base 112, respectively. As described in further detail below, the first elongated element 120A and the second elongated element 120B may each include a plurality of elongated slots 126 disposed opposite the reconditioning elements 116A, 116B.

With reference now to FIGS. 2-6, the attachment elements 114A, 114B, 114C, 114D detachably couple the chain reconditioning device 110 to the conveyor system 10. In some embodiments and as shown in the figures, the chain reconditioning device 110 may include four attachment elements 114A, 114B, 114C, 114D, although other numbers of attachment elements are also contemplated (that is, one to three, five or more). In some embodiments, one or more attachment elements may be disposed on opposite sides 122A, 122B of the base 112. For example, a first attachment element 114A and a second attachment element 114B may be coupled to the first elongated element 120A and disposed on the first side 122A and the second side 122B of the base 112, respectively. A third attachment element 114C and a fourth attachment element 114D may be coupled to the second elongated element 120B and disposed on the first side 122A and the second side 122B of the base 112, respectively.

Figure 6:
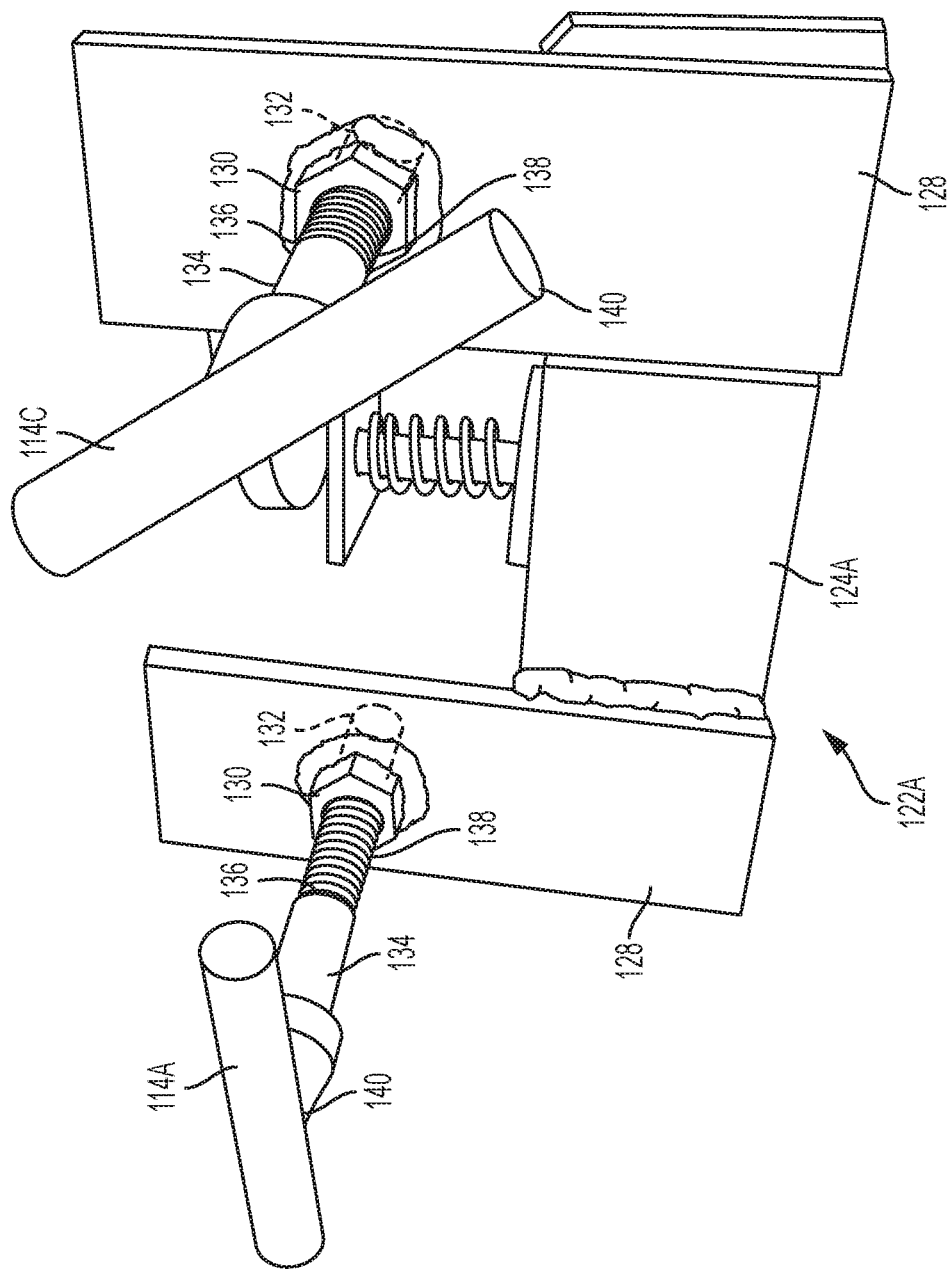
FIG. 6 is a detail perspective view of two attachment elements of the chain reconditioning device of FIG. 1.

In some embodiments and referring specifically to FIG. 6, each attachment element 114A, 114B, 114C, 114D includes a plate 128 coupled to the first elongated element 120A or the second elongated element 120B on the first side 122A or the second side 122B of the base 112. The plate 128 may extend substantially perpendicularly from the elongated element (that is, perpendicularly within 10 degrees). The plate 128 includes a threaded nut 130 that overlies a through hole 132 that extends through the plate 128. The nut 130 couples to a threaded screw 134 that extends through the nut 130 and the through hole 132. Alternatively, the through hole 132 may be threaded, and the screw 134 may be coupled to the through hole 132. In either case, the screw 134 is rotatable relative to the plate 128 to cause translation of the screw 134 relative to the plate 128. Such translation of the screw 134 facilitates detachably coupling the device 110 to the conveyor system 10.

In some embodiments and still referring specifically to FIG. 6, the screw 134 may include a shaft 136 that defines threads 138. Opposite the threads 138, the shaft 136 couples to a handle 140 that facilitates rotation of the screw 134 relative to the nut 130 and plate 128. The handle 140 may extend substantially perpendicularly to the shaft 136 (that is, perpendicularly within 10 degrees).

Figure 7:
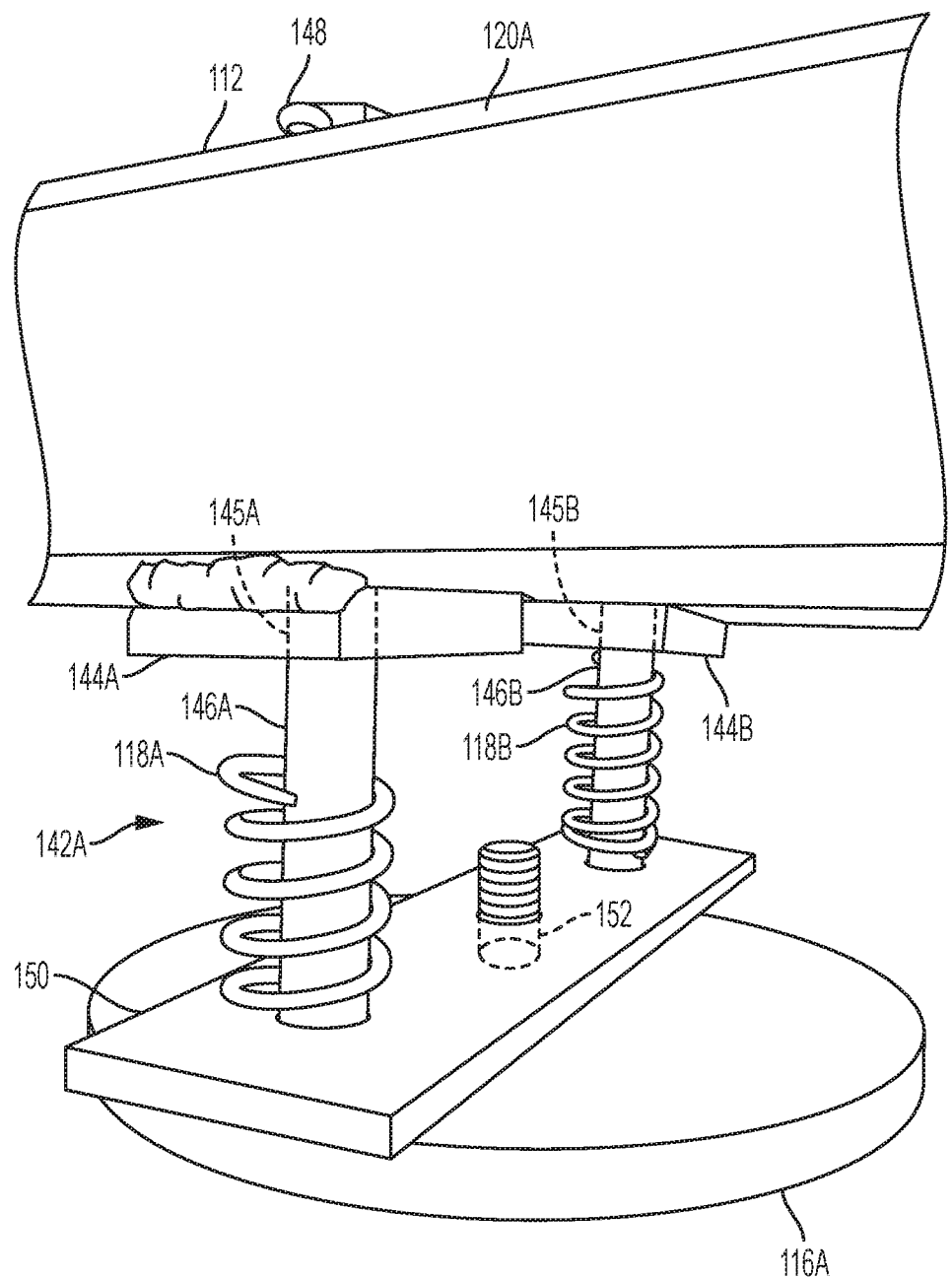
FIG. 7 is a detail perspective view of a reconditioning element of the chain reconditioning device of FIG. 1.

Referring now to FIGS. 2-5 and specifically FIG. 7, the chain reconditioning device 110 further includes one or more support assemblies 142A, 142B that detachably carry the one or more reconditioning elements 116A, 116B. In some embodiments and as shown in the figures, the chain reconditioning device 110 may include a number of support assemblies 142A, 142B corresponding to the number of reconditioning elements 116A, 116B. That is, each support assembly 142A, 142B detachably couples to one of the reconditioning elements 116A, 116B. Alternatively, a support assembly may carry a plurality of reconditioning elements, or a plurality of support assemblies may carry a single reconditioning element.

Still referring to FIGS. 2-5 and 7, each support assembly 142A, 142B includes a structure that facilitates linear translation of the coupled reconditioning element 116A, 116B relative to the base 112. Specifically, each support assembly 142A, 142B includes a first bracket 144A and a second bracket 144B that are coupled to the first elongated element 120A and the second elongated element 120B, respectively, opposite the plurality of elongated slots 126. The first bracket 144A and the second bracket 144B include a first through hole 145A and a second through hole 145B, respectively, that translatably receive a first shaft 146A and a second shaft 146B, respectively. The first shaft 146A and the second shaft 146B extend through the first through hole 145A and the second through hole 145B, respectively, and into the first elongated element 120A and the second elongated element 120B. The first shaft 146A is translatably received by one of the slots 126 of the first elongated element 120A. Similarly, the second shaft 146B is translatably received by one of the slots 126 of the second elongated element 120B. Proximate the elongated slots 126 and opposite the first bracket 144A and the second bracket 144B, the first shaft 146A and the second shaft 146B may include a stop element (for example, a removable pin 148) that engages the elongated element to inhibit the shaft from detaching from the elongated element.

Proximate the first bracket 144A and second bracket 144B, the support assembly 142A, 142B includes the biasing elements 118A, 118B. The support assembly 142A, 142B may include two biasing elements 118A, 118B, as shown in the figures, although different numbers of biasing elements are also contemplated (specifically, one or three or more). The first biasing element 118A and the second biasing element 118B may be compression springs (for example, 20 lb-0.12 wire compression springs). The first compression spring and the second compression spring are carried by the first shaft 146A and the second shaft 146B, respectively. To urge the reconditioning element 116A, 116B away from the base 112 and into engagement with a chain 14, the first compression spring and the second compression spring are disposed between the first bracket 144A and the second bracket 144B, respectively, and a plate 150 coupled to the first shaft 146A and the second shaft 146B. The plate 150 includes a threaded through hole 152 for detachably coupling to a screw of one of the reconditioning elements 116A, 116B.

The reconditioning elements 116A, 116B engage and recondition the chains 14 as the chains 14 are driven and move relative to the reconditioning elements 116A, 116B. The device 110 may include a number of reconditioning elements corresponding to the number of chains of the conveyor system. Alternatively, the device 110 may include a plurality of reconditioning elements for each chain 14, or one reconditioning element that reconditions multiple chains simultaneously or at different times (for example, by repositioning the chain reconditioning device 110 to engage the reconditioning element with different chains). In some embodiments and as shown in the figures, the reconditioning elements 116A, 116B are abrasive pads (for example, 24 grit, 4.5 inch depressed-center wheels). In some embodiments and as shown in the figures, the reconditioning elements 116A, 116B have disk shapes.

The components of the chain reconditioning device 110, specifically the base 112, the attachment elements 114A, 114B, 114C, 114D, and the support assemblies 142A, 142B, may be formed of various materials (for example, steel) and may be coupled in various manners (for example, welding). The dimensions of the components of the chain reconditioning device 110 can be selected to accommodate a particular conveyor system. Furthermore, chain reconditioning devices according to embodiments of the present disclosure may be reconfigurable to accommodate conveyors systems of different configurations. For example, the first bracket 144A and second bracket 144B are shown as being fixedly coupled to the first elongated element 120A and the second elongated element 120B (via welded connections), respectively. As a result, the support assemblies 142A, 142B are fixed in a length direction of the elongated elements 120A, 120B. Alternatively, the first bracket 144A and the second bracket 144B may be movably or detachably secured to the first elongated element 120A and the second elongated element 120B (for example, via fasteners), to facilitate repositioning the support assemblies 142A, 142B and the reconditioning elements to accommodate conveyor systems with different chain layouts.

Figure 8:
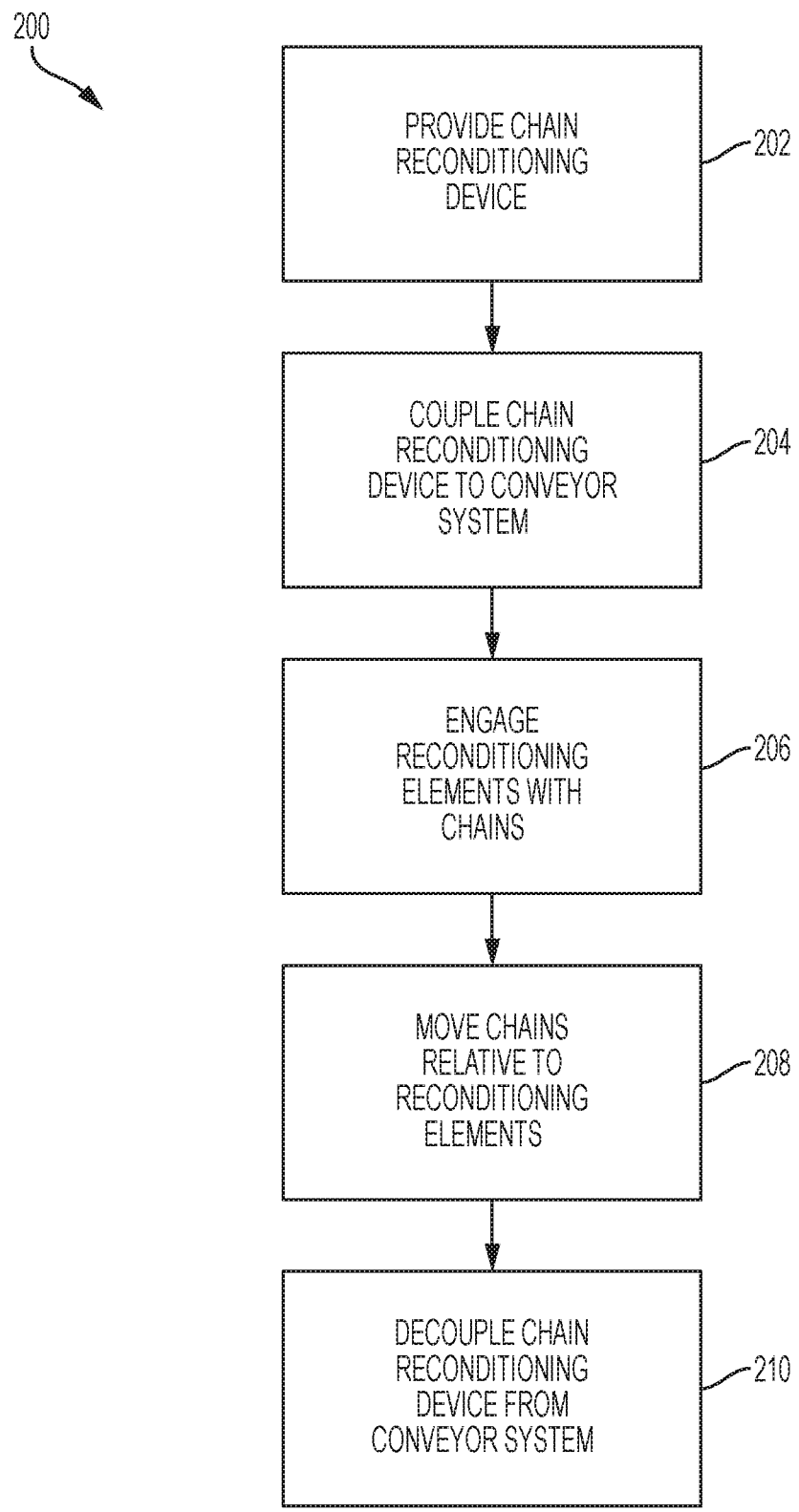
FIG. 8 is a flowchart of a method for reconditioning a chain of a conveyor system according to an embodiment of the present disclosure.

Referring now to FIG. 8, an exemplary method 200 for reconditioning one or more chains of a conveyor system is illustrated. The following description illustratively refers to the chain reconditioning device 110, although it is understood that the method 200 may be employed in connection with any of embodiments contemplated herein. The method 200 begins at block 202 by providing the chain reconditioning device 110. At block 204, the chain reconditioning device 110 is coupled to the conveyor system. In some embodiments, coupling the chain reconditioning device 110 to the conveyor system includes positioning the chain reconditioning device 110 over the conveyor system. Alternatively, the chain reconditioning device 110 may underlie the conveyor system or be positioned in any other manner and/or location in which the reconditioning elements 116A, 116B may engage the chains. In some embodiments, coupling the chain reconditioning device 110 to the conveyor system includes engaging the attachment elements 114A, 114B, 114C, 114D with the conveyor system (for example, by rotating the screws 134 relative to the base 112 to thereby translate the screws 134 relative to the base 112). At block 206, the reconditioning elements 116A, 116B are engaged with the chains. In some embodiments, coupling the chain reconditioning device 110 to the conveyor system causes the reconditioning elements 116A, 116B to engage the chains. At block 208, the chains are moved (that is, energized and driven) relative to the reconditioning elements 116A, 116B. As the chains move, the biasing elements 118A, 118B urge the reconditioning elements 116A, 116B linearly away from the base 112 to maintain engagement of the reconditioning elements 116A, 116B with the chains, and the reconditioning elements 116A, 116B recondition the chain. At block 210, the chain reconditioning device 110 is decoupled from the conveyor system. In some embodiments, decoupling the chain reconditioning device 110 from the conveyor system includes disengaging the attachment elements 114A, 114B, 114C, 114D from the conveyor system (for example, by rotating the screws 134 relative to the base 112 to thereby translate the screws 134 relative to the base 112).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A device adapted to be coupled to a conveyor system and recondition a chain of the conveyor system, the device comprising:
   a base;
   at least one attachment element coupled to the base, the attachment element configured to detachably couple the device to the conveyor system;
   at least one reconditioning element coupled to the base, the reconditioning element configured to engage and recondition the chain as the chain moves relative to the reconditioning element; and
   a means for storing energy upon being compressed and for releasing energy upon expansion, wherein the means for storing energy upon being compressed and for releasing energy upon expansion is coupled to the reconditioning element and urges the reconditioning element away from the base and into engagement with the chain.

2. The device of claim 1, wherein the attachment element comprises a screw, the screw being rotatable relative to the base to cause translation of the screw relative to the base to detachably couple the device to the conveyor system.

3. The device of claim 1, wherein the attachment element is a first attachment element, the first attachment element is disposed on a first side of the base, and further comprising a second attachment element coupled to the base on a second side of the base opposite the first side, the second attachment element being adapted to detachably couple the device to the conveyor system.

4. The device of claim 1, wherein the reconditioning element comprises an abrasive pad.

5. The device of claim 4, wherein the abrasive pad comprises a coarseness of 24 grit.

6. The device of claim 1, wherein the means for storing energy upon being compressed and for releasing energy upon expansion applies a 40 lb. force to the abrasive pad.

7. The device of claim 1, wherein the means for storing energy upon being compressed and for releasing energy upon expansion urges the reconditioning element linearly away from the base and into engagement with the chain.

8. A device adapted to be coupled to a conveyor system and recondition at least one chain of the conveyor system, the device comprising:
   a base;
   at least one reconditioning element coupled to the base, the reconditioning element being adapted to engage and recondition the chain as the chain moves relative to the reconditioning element; and
   a means for storing energy upon being compressed and for releasing energy upon expansion coupled to the reconditioning element, the means for storing energy upon being compressed and for releasing energy upon expansion urging the reconditioning element linearly away from the base and into engagement with the chain.

9. The device of claim 8, wherein the means for storing energy upon being compressed and for releasing energy upon expansion is compressed between the base and the reconditioning element to urge the reconditioning element linearly away from the base and into engagement with the chain.

10. The device of claim 9, further comprising a shaft carrying the compression spring and coupled to the reconditioning element, the shaft being translatably coupled to the base to facilitate linear translation of the reconditioning element relative to the base.

11. The device of claim 10, further comprising a support coupled to the shaft opposite the base, the reconditioning element being detachably coupled to the support.

* * * * *